(12) United States Patent
Khattar et al.

(10) Patent No.: US 10,387,855 B2
(45) Date of Patent: Aug. 20, 2019

(54) COMPUTERIZED METHODS AND COMPUTER SYSTEMS FOR MATCHING CUSTOMERS WITH MERCHANTS

(71) Applicant: MASTERCARD INTERNATIONAL INCORPORATED, Purchase, NY (US)

(72) Inventors: Shweta Khattar, New Delhi (IN); Amit Gupta, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 258 days.

(21) Appl. No.: 15/635,330

(22) Filed: Jun. 28, 2017

(65) Prior Publication Data

US 2018/0005204 A1 Jan. 4, 2018

(30) Foreign Application Priority Data

Jul. 1, 2016 (SG) .............. 102016054335

(51) Int. Cl.
*G06Q 30/02* (2012.01)
*G06Q 20/10* (2012.01)
*G06F 16/22* (2019.01)
*G06Q 10/06* (2012.01)
*G06Q 20/20* (2012.01)
*G06Q 30/06* (2012.01)

(52) U.S. Cl.
CPC .......... *G06Q 20/102* (2013.01); *G06F 16/22* (2019.01); *G06Q 10/067* (2013.01); *G06Q 20/204* (2013.01); *G06Q 30/0631* (2013.01); *G06Q 30/0224* (2013.01); *G06Q 30/0255* (2013.01); *G06Q 30/0261* (2013.01); *G06Q 30/0267* (2013.01); *G06Q 30/0269* (2013.01)

(58) Field of Classification Search
CPC .......... G06Q 30/0224; G06Q 30/0255; G06Q 30/0269; G06Q 30/0261; G06Q 30/0267
See application file for complete search history.

*Primary Examiner* — A. Hunter Wilder
(74) *Attorney, Agent, or Firm* — Budzyn IP Law, LLC

(57) ABSTRACT

For each of multiple customers, a computer system constructs a customer preference model using transactional level data relating to purchases the customers have made using respective payment cards. The computer system has access to a database with merchant data, including profiles of merchants. Upon the customer contacting the computer system in respect of a specific product, the computer system (or an application running on a communication device of the customer which is able to access the customer's preference model and the database of merchant data) uses the customer preference model to match the customer to merchants who offer the product and who have profile matching the customer's preference model. The customer may provide details of his/her payment card identify the customer to the computer system.

11 Claims, 7 Drawing Sheets

COMPUTERIZED METHODS AND COMPUTER SYSTEMS FOR MATCHING CUSTOMERS WITH MERCHANTS

FIELD OF THE INVENTION

The present invention relates to methods and systems for matching potential customers to merchants.

BACKGROUND OF THE INVENTION

Individuals (here referred to as "customers") who want to purchase certain goods and/or services (referred to in this document collectively as "products") face a bewildering range of options. This is particularly the case for a customer who is travelling to an unfamiliar destination, or who has recently changed address to a new locality, and who has to select providers of products (here referred to as "merchants") in that locality or destination. Nowadays, such a customer can search online using a search engine for places to stay (hotel bookings), places to visit (attractions), dining options (e.g. restaurants), and car rental options, but picking appropriate merchants from the potentially thousands on offer soon becomes a tedious task. Some customers rely on online reviews left by previous purchasers of the products, but for some providers reviews are not available, are not reliable, or reflect the views of individuals very different from the customer doing the search.

A particular problem is that often many merchants are inappropriate for the customer's preferences (e.g. their prices are outside a range of prices which the customer is prepared to pay) even if they are suitable for other customers. It can take the customer considerable time to discover this. This is particularly true if a given merchant does not publish its tariff online, and/or if the merchant has a complex system of special offers which mean that the actual price the customer would be charged is different from what the standard tariff would suggest.

SUMMARY OF THE INVENTION

The present invention aims to provide customers with recommendations of merchants, and/or of product offers offered by the merchants.

In general terms, the invention proposes that for each of multiple customers, a computer system constructs a customer preference model using transactional level data relating to purchases the customers have made using respective payment cards. The computer system has access to a database with merchant data, including profiles of merchants.

Upon the customer specifying a product the customer wishes to buy, the computer system (or an application running on a communication device of the customer which is able to access the customer's preference model and the database of merchant data) uses the customer preference model to match the customer to merchants who offer the product and who have profiles matching the customer's preference model. The customer may provide data identifying his/her payment card to identify the customer to the computer system.

The customer preference model may comprise any one or more (preferably all) of the following customer properties: historical transaction characteristics (i.e. spending patterns taking into account the value of the customer's previous transactions), price sensitivity, and brand loyalty.

Optionally, the system may characterize customers as either a customer for whom price sensitivity is most important, or as a customer for whom brand loyalty is most important.

The customer preference model may, for one or more of the customer properties, assign a customer to one of a predetermined set of tiers.

Some of these characteristics may be hard to deduce using the simplest forms of transactional data available (which simply indicate the recipient of the payment, the size of the payment and the time/date of the payment). However, for certain transactions transactional data further comprises "addendum data". For example, it is already increasingly common for transactions involving airline ticket purchases to include addendum data including all relevant passenger and flight information. Similar addendum data is also commonly included in transaction data for car rentals, as well as for certain restaurant payments, lodging (hotel) payments and railway payments. It is used for example for verifying expenses claims. The addendum data may include stock keeping unit (SKU) data, which specifies the actual product(s) purchased in the transaction. The addendum data may be used by an embodiment of the present data to obtain information about certain properties of the customer preference model.

Furthermore, the provider of the computer system may be able to obtain further information from the merchants relating to the transactions. For example, if the provider of the computer system wishes to compile a customer preference model relating to a certain customer, then, following a transaction involving the customer and a certain merchant, the merchant may supply the computer system with further information about the transaction (e.g. what products were purchased at what price). The merchants themselves may decide when to do this (e.g. because a payment card meeting one or more criteria was used in the transaction, such as a card issued by a certain issuer bank and/or provided by a certain payment network), or may submit a query to the payment network about whether the further information should be transmitted to the computer system and only supply the information if the result of the query is positive. Alternatively, the computer system may issue a query about the transaction to the merchant, which provides the further information in response.

By participating in an embodiment of the present invention a merchant is potentially able to expand its revenue by being recommended to customers who suit the merchant both in terms of the merchant's products being suitable, and the prices too being suitable. Profitability is improved by focusing on relevant customers. The embodiment provides in effect targeted marketing: identifying the right customers to provide offers to at the right time. These may be customers who are already customers of the merchant, but the invention makes it possible to increase the "share of the wallet" for those customers.

As used in this document, the term "payment card" refers to any cashless payment device associated with a payment account, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, transponder devices, NFC-enabled devices, and/or computers.

The invention may be expressed in terms of a computer system which forms and uses the customer preference model, in terms of a communication device associated with a customer, or in terms of the method performed by the computer system or communication device. It may furthermore be expressed in terms of a computer program product (e.g. stored in non-transitory form on a tangible data storage device) which contains program instructions to cause a processor of the communication device to perform the method.

BRIEF DESCRIPTION OF THE FIGURES

An embodiment of the invention will now be described for the sake of example only with reference to the following figures in which.

DETAILED DESCRIPTION OF THE EMBODIMENT

Figure 1:
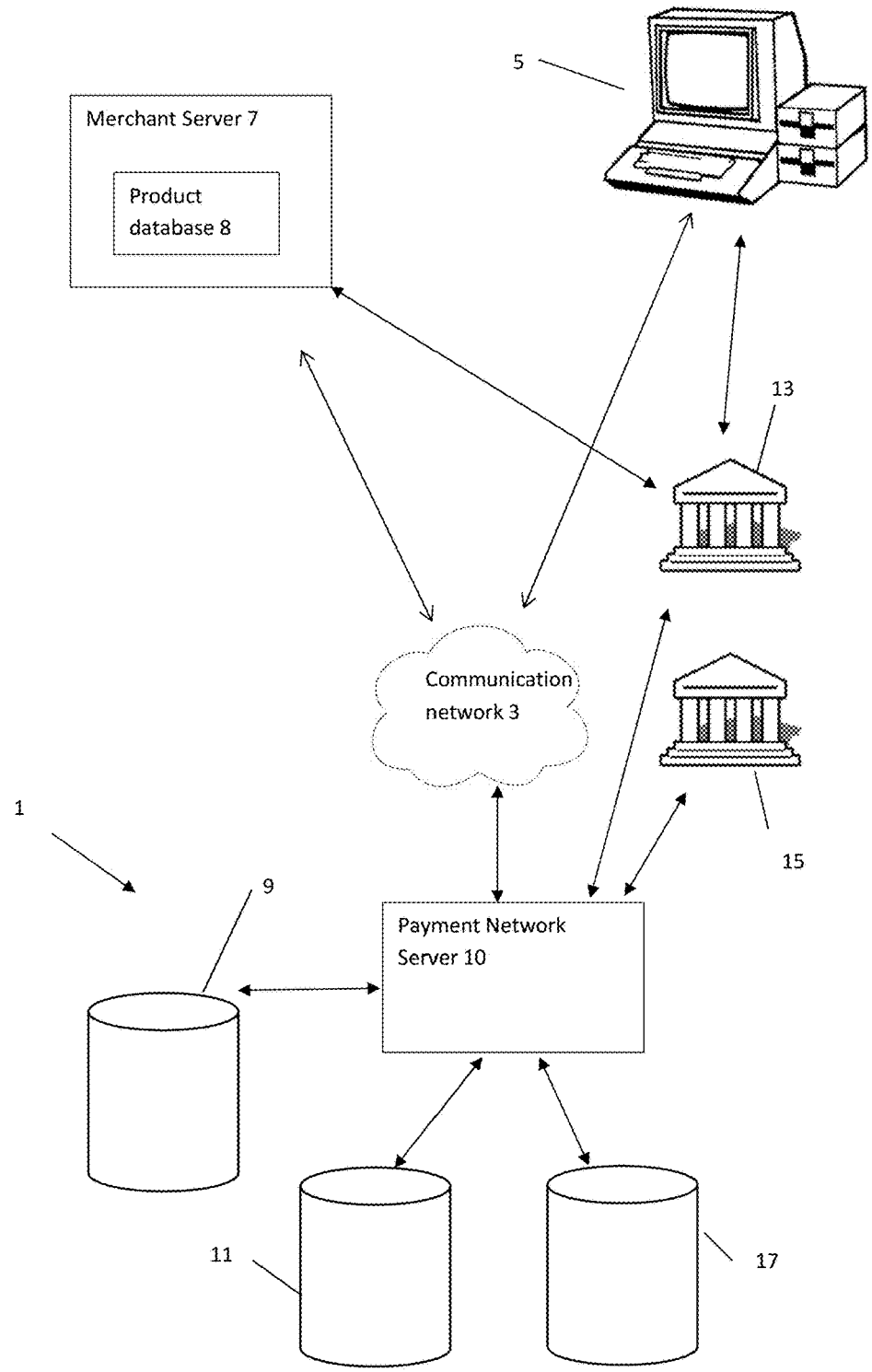
FIG. 1 shows a computerized network including a computer system which is an embodiment of the invention.

Referring firstly to FIG. 1, a computerized network is shown including a computer system 1 which is an embodiment of the invention. The computer system 1 is associated with a payment card network for processing payments made using payment cards issued by issuer banks. For example, the computer system 1 may be owned by a company which owns the payment card network. It includes a payment network server 10 and a set of databases 9, 11, 17. A first mode of operation of the computer system 1 will be explained below with reference to FIGS. 1 and 2. A second mode of operation of the computer system 1 will be explained below with reference to FIGS. 3 and 4.

In the first mode of operation, the computer system 1 interacts over a communication network 3 such as the internet with a plurality of point of sales (POS) terminals at retail locations, and with a plurality of merchant servers implementing online stores. For simplicity, only a single POS terminal 5 and a single merchant server 7 are shown in FIG. 1, and it is assumed below that they are associated with the same merchant, but the embodiment is not limited in this respect. The merchant server 7 includes a product database 8 with data about the products offered by the online store.

As in conventional payment card processing system, upon a customer initiating a payment transaction using the POS terminal 5, the POS terminal 5 reads payment card data (such as the primary account number (PAN)) from the payment card sufficient to identify a payment account associated with the customer and maintained by an issuer bank 15. The POS terminal 5 passes the payment card data together with details of the intended payment transaction to the server 13 of a bank (the "acquirer" bank) where the merchant maintains an account. The acquirer bank server 13 identifies that the payment card is linked to the payment network associated with the computer system 1, and passes the payment card data to the payment network server 10 of the computer system 1 together with the details of the intended payment transaction. In some arrangements, acquirer bank server 13 is replaced by a server of a third party (payment processor) authorized by the acquirer, which performs the role as the acquirer bank server 13 in the steps explained above and in the following steps.

Similarly, upon a customer initiating a payment transaction at the online store using a communications device (not shown) associated with the customer, the customer enters the payment card data into the communications device which transmits it to the merchant server 7. The merchant server 7 passes the payment card data together with details of the intended payment transaction to a payment gateway, which forwards the payment card data and the details of the intended transaction to the acquirer bank server 13. The acquirer bank server 13 identifies that the payment card is linked to the payment network associated with the computer system 1, and passes the payment card data to the payment network server 10 of the computer system 1 together with the details of the intended payment transaction.

In either case, the details of the payment transaction include the amount of the payment and data sufficient to identify a payment account associated with the merchant and maintained by an acquirer bank 13. The details of the payment transaction may further include addendum data, which may include SKU level information which specifies details of the actual product(s) purchased in the transaction. In both cases, the payment network server 10 issues a payment request to an issuer bank 15 which maintains a payment account associated with the customer and identified by the payment card data. The issuer bank 15 performs an authorization process, and if that is successful, reserves an amount of money from the payment account of the customer, and confirms to the payment network server 10 that the payment will be made. The payment network server 10 routes the authorization message to the acquirer bank server 13 (or the payment processor if the acquirer bank server is replaced with the payment processor). In the case of a purchase made using the POS terminal 5, the acquirer bank server 13 (or payment processor) routes the authorization message to the POS terminal 5; in the case of an online purchase, the acquirer bank server 13 (or payment processor) routes the authorization message to the payment gateway which routes it to the merchant server 7. The payment transaction is then completed, although the payment from the issuer bank to the acquirer bank is actually typically made later, during a periodic clearing operation in respect of a large number of payment transactions.

As in a conventional payment card processing system, the computer system 1 keeps a record of the transaction in a database 9, based on the data the payment network server 10 received from the POS terminal 5 and/or merchant server 7.

In an embodiment of the present system the POS terminal 5 or merchant server 7 may include more detailed information about the transaction than in a conventional payment process. For example, although it is conventional to include addendum data for certain sorts of transactions (e.g. ones relating to lodging, flights or car rental), in the present system the POS terminal 5 or merchant server 7 may supply addendum data for a wider range of products. Furthermore, the details of the intended payment transaction may include information which is not normally present in addendum data, such as information about whether the product to be bought is discounted, whether the customer has presented a loyalty card, etc.

Optionally, the POS terminal 5 or merchant server 7 may recognise that the payment card is linked to the payment network associated with the computer system 1. It may be as a consequence of this that the POS terminal 5 or merchant server 7 includes the detailed information about the transaction in the data it sends the payment network server 10. In other words, the POS terminal 5 or merchant server 7 may provide less information about the transaction if the customer's payment card is not linked to the payment network associated with the computer system 1.

The payment network server 10 may store the detailed information about the transaction in the database 9 for all payment cards, e.g. upon receiving the transaction data from the POS terminal 5 or merchant server 7. Alternatively, the computer system 1 may determine whether the customer or the payment card is one of a predetermined set of customers or payment cards, and only store the detailed information about the payment transaction if that determination is positive. These may for example be customers who have signed up for use of the service described below with reference to FIGS. 3 and 4. In this case, the POS terminal 5 or merchant server 7 may determine whether the information received from the POS terminal 5 or merchant server 7 is detailed enough to meet a criterion, and if not interrogate the POS terminal 5 or merchant server 7 for the detailed information, e.g. including information about the product sold in the transaction.

Figure 2:
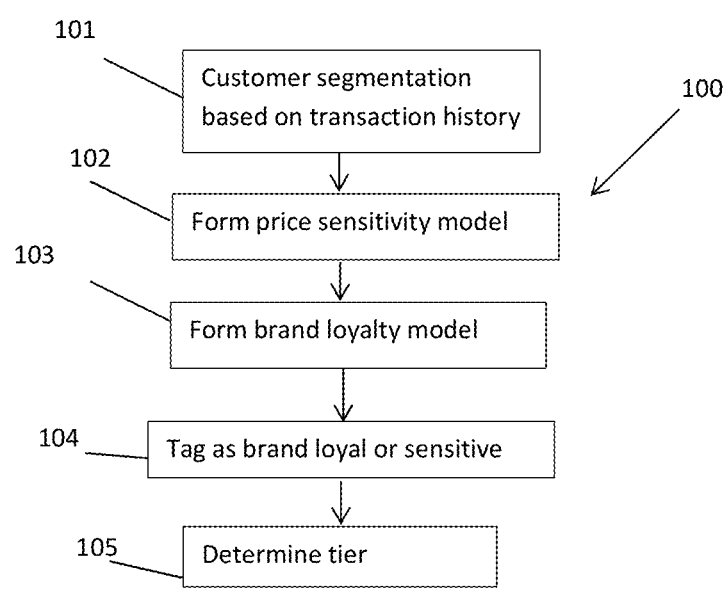
FIG. 2 is a flow diagram of a customer analysis process carried out by the computer system of FIG. 1 in a first mode of operation.

The data stored in the database 9 is analysed in the method 100 illustrated in FIG. 2. This is analysis may be performed by the payment network server 10 as illustrated in the bo The method may be carried out, for example, in respect of any payment card when a certain amount of information has accumulated in the database 9 about payment transactions involving the payment card. Alternatively, this may be done only in respect of any payment card for which the corresponding customer has signed up for the service described below with reference to FIGS. 3 and 4. Optionally, if the customer has multiple payment cards linked to the payment network, the data in respect of these cards may be agglomerated to obtain information about the customer, but for simplicity in the following discussion it is assumed that the customer is associated with only one payment card linked to the payment network.

In step 101, the payment network server 10 uses the data in the database 9 to characterize the past transaction history of the customer. This may be by extracting one or more parameters such as the total spend of the customer using the payment card during a certain period, an average spend by the customer per transaction, the total number of transactions, etc. As a result of this analysis, the customer is allotted to one of a pre-determined number of customer segments. These segments are indicative of the customer's potential to spend.

In step 102, the payment network server 10 forms a model of the price sensitivity of the customer, including one or more numerical payment sensitivity measures. For example, if the SKU data indicates that the product is an up-market product (e.g. a luxury hotel room), this may indicate that the price sensitivity of the customer is low. In another example, if the SKU data for a certain transaction indicates that the customer has paid a certain amount for a certain product, the payment network server 10 may compare this with SKU data for other customers who, according to the SKU data for other payment transactions, bought a similar product from another merchant at a similar time, to determine whether the customer paid a low or high price for the article. If it determines that the customer paid a relatively high price, this may indicate that the customer has not shopped around for the cheapest merchant, which indicates that the customer's price sensitivity is low. If the addendum data indicates that the customer uses a loyalty card, that information may be used to increase the price sensitivity measure.

In another possibility, price sensitive customers may be identified as customers who only buy certain products at times when the price of those products is low (because of discount offers or other time variations in price, such as seasonal variations). These customers may be identified by comparing the times at which they make purchases of certain products (according to the SKU data) with a database of data describing the time-variation of the prices of those products, to identify statistically significant correlations. A numerical measure of the correlation for a given customer may be compared to a threshold to determine whether the customer is price sensitive.

A specific example of a price sensitivity model which may be used in an embodiment of the invention is given in "Identifying Price Sensitive Consumers: The Relative Merits of Demographic vs. Purchase Pattern Information", by B-D. Kim, K. Srinivasan and R. T. Wilcox, Journal of Retailing, volume 75(2), pp173-193, 1999.

In step 103, the payment network server 10 forms a model (e.g. a numerical measure of the brand loyalty of the customer, e.g. one or more numerical brand loyalty measures. The model may be indicative of loyalty to a particular merchant, or loyalty to a particular product. An example of determining that the customer is loyal to a certain merchant would be the payment network server 10 determining that the customer tends to use a small number of merchants in a given retail sector which contains a much larger number of merchants (e.g. if the computer system determines that in 90% of cases the customer does supermarket shopping in a single supermarket, this is a good indication that the customer is loyal to that supermarket). An example of determining that the customer is loyal to a particular product is if the transaction data (e.g. the SKU information in addendum data of the transaction data) indicates that the customer buys a certain product rather than its competitors. For example, the transaction data may show that although the customer hires cars from a large number of car rental companies in different geographical locations, he always hires a car of a certain make. Or that although the customer does grocery shopping at various retail outlets, the customer buys a certain brand of toothpaste (or another category of product) with a frequency above a certain threshold, irrespective of what other products may be available. Of course, there may be reasons other than brand loyalty why a customer always purchases the same products and/or often uses the same merchant (e.g. because the merchant has a very convenient geographic location), but these factors would influence the brand loyalty model less if the brand loyalty model takes into account the customer's payment transactions with respect to a high number of products and/or merchants.

Note that the embodiment may use any of multiple definitions of loyalty. A first definition is that in a given commercial sector, the customer purchases products only from a particular merchant. A second definition ("Customer Stickiness") is that the customer makes repeat purchases from a certain merchant above a certain level, and that that merchant has a very high "Share of Wallet" (i.e. a high share of the customer's total purchases in all commercial sectors). The term "high" may be defined as above a pre-defined threshold. The threshold may vary according to the commercial sector of the merchant, to reflect the number of merchants operating in the sector, and may vary from one merchant to another. It may be set by trial-and-error, or may be determined (e.g. automatically) for a given merchant by calculating the merchant's respective "share of wallet" for each of a plurality of the merchant's customers, and then selecting the threshold such that for a certain proportion (e.g. 60% or 80%) of those customers the merchant's "share of wallet" is below the threshold. Thus, a given customer may be identified as being loyal to the merchant if, for example, the customer's spending with these merchant is greater than that of 60% of the merchant's customers. The second definition of loyalty may be preferable, since if a certain customer very rarely buys a certain type of product, it may not matter that when this happens the customer always buys that product from the same merchant (i.e. is loyal according to the first definition).

In step 104, the server 1 uses the price sensitivity model and the brand loyalty model to categorise the customer according to whether the customer's behaviour is better described by price sensitivity or by brand loyalty (i.e. "tag" the customer as price sensitive or brand loyal). For example, if a customer shows great loyalty to certain products and/or merchants, this would suggest that the customer is not prepared to shop around for cheaper products; in other words, that brand loyalty is a better determinant of the customer's behaviour than price loyalty. Note that even if the server 1 only has information about the customer's purchases for certain sorts of products (e.g. hotel lodging, car rental and flights), that can be enough to assess with reasonable accuracy whether price sensitivity or brand loyalty better characterizes the customer, and this determination is likely to apply to other types of products for which such detailed transaction information is not available.

In step 105, the customer is allotted to a tier to indicate the extent to which the characteristic with which the customer was tagged in step 104 (i.e. price sensitive or brand loyal) describes the user behaviour. For example, there may be three tiers of price sensitivity, such that a price sensitive customer is allotted, based on the price sensitivity model, to one of the tiers "very price sensitive", "moderately price sensitive", or "slightly price sensitive". Similarly, a customer tagged as being brand loyal, can be allotted, based on the brand loyalty model, to one of three tiers: "very brand loyal", "moderately brand loyal", or "slightly brand loyal". The results of steps 101 to 105 are stored in the database 11.

Figure 3:
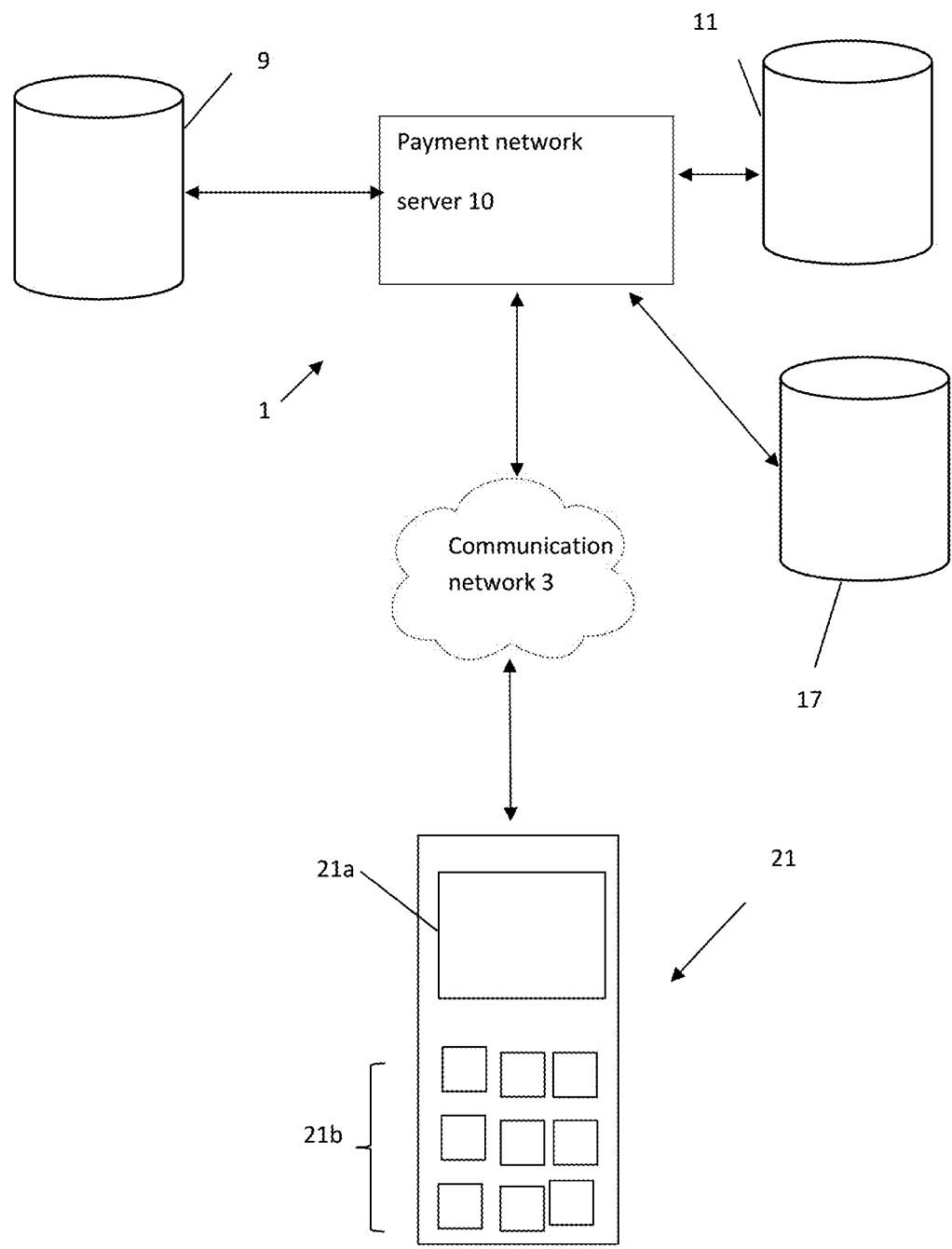
FIG. 3 shows a second mode of operation of the computer system of FIG. 1.

Turning to FIG. 3, a second mode of operation of the computer system 1 is shown. In this mode the customer uses a communication device 21 to communicate with the computer system 1. The communication device 21 has a screen 21a (for example, a touch screen) and keys 21b (which may be virtual keys displayed on screen 21a), and communicates with the payment network server 10 over the communication network 3. The communication device 21 may use a standard browser with communicates with a website maintained by the payment network server 10. As described below, the payment network server 10 accesses the databases 11 and 17 during this process, to perform the method 200 illustrated in FIG. 4.

Alternatively, the communication device 21 may run an application which is able to communicate with the payment network server 10. In this case, the payment network server 10 may perform the method 200 with the application merely relaying information between the customer and the payment network server 10. Or alternatively a processor of the communication device 21 may perform the method 200 using program instructions contained in the application. During this process the application would communicate with the payment network server 10 to access the databases 11 and 17.

The method 200 uses a database 17 which was not used in the method 100. This is a database which stores information about merchants, including what products they sell (which may be just an indication of what general commercial field they operate in, or what specific products they sell). The merchants for whom information is stored in the database 17 may from any industry such as: the hotel industry; the restaurant industry; the apparel industry; the hospital industry; the airline industry; the telecom industry; the jewellery industry; the fuel (e.g. petrol/gasoline) industry, etc.

The database 17 further includes one or more additional characteristics of each merchant.

At least one of the additional characteristic may be based on average ticket size (i.e. the mean value of payment transactions to the merchants), the average of the amount each of the merchants customers spent at the merchant during a certain period (i.e. the total of all the payment transactions which all customers made to the merchant during the period, divided by the number of those customers), or the frequency with which customers make a repeat payment transaction to the merchant. These characteristics are preferably chosen to match the customer characteristics derived in step 101. The computer system 1 may derive such characteristics of the merchant based on transactional data stored in the database 9, particularly if the criterion is average ticket size, the average of the amount each of the merchant's customers spent at the merchant during a certain period, or the frequency with which customers make a repeat payment transaction to the merchant.

The information may further include an average price of products offered by merchants, e.g. in a single product category (e.g. dresses). The information also preferably includes information about the present prices of specific products the merchant is offering. This information is preferably up-to-date enough to indicate whether the merchant is presently offering a temporary discount on products in the category.

In principle, some or all of the information in the database 17 about the additional characteristic(s) may be collected by the computer system 1 automatically, using transaction data and the addendum data. Alternatively, the merchant may supply this information to the computer system 1 to include in the database 17. In particular, merchants who wish to participate in the system may supply (e.g. at intervals) information about product price offers they are making.

The information in the database 17 may categorize the merchants into respective tiers based on the one or more additional characteristics.

In step 201, a customer indicates to the communication device 21 that the customer has an interest in buying a product. In certain embodiments, this may be done explicitly, for example by the customer, at a time when the website or application has been activated, making a choice from a drop-down menu or entering search terms into a search box. Alternatively, the customer may carry out some behaviour which triggers the communication device 21 (or server 1) to infer that the customer may wish to wish to purchase a product. For example, if the customer buys a certain piece of equipment from an online store, the communication device 21 may infer that the customer is interested in accessories for that piece of equipment.

In optional step 202, the customer indicates a location to the communication device 21. This is a geographical location, e.g. a town, or within a certain distance of a certain exact position (e.g. the user's present location), or in a certain shopping mall. Again, this may be done explicitly, for example by the customer, at a time when the website or application has been activated, making a choice from a drop-down menu or entering search terms into a search box, or making a command to indicate that the customer's present location, or one of a plurality of previously stored locations, should be taken as the location. Or, the customer may indicate the location choice implicitly, for example by purchasing a travel ticket to a certain location. Note that if step 2 is omitted (e.g. because the customer enters into the communication device 21 a command to omit it), then subsequent steps of the method are performed without reference to geographical location. This is appropriate, for example, when the method 200 is being performed to identify merchants who sell mail-order goods.

In step 203, the communication device 21 transmits to the payment network server 10 data identifying the payment account. In principle, this can be the 16-digit PAN (primary account number) of the payment card. However, in other embodiments it may be a token which the payment network server 10 can use to access a database to identify the payment account. The token may have been generated earlier. For example it may have been generated by the payment network server 10 at a time when the customer registered to participate in the merchant recommendation service, or by the issuing bank 15.

In step 204, the payment network server 10 accesses the database 11 using the payment account identification data, to obtain the corresponding customer preference model.

In step 205, the payment network server 10 identifies one (or more) of the merchants who supplies the product specified in step 201. If optional step 202 was carried out, step 205 may be limited to finding merchants in the location specified in step 202. Step 205 further includes calculates a compatibility index between the customer and such merchants, using the customer preference model and the data about the merchants in the database 17. The highest one or more merchants in this ranking are identified ("matched" with the customer). If no merchants have a compatibility index above a threshold, then no merchants are matched with the customer.

One way of determining the compatibility index is by comparing the customer segmentation according to the customer preference model, with the merchant. For example, a customer who is identified as consistently making small purchases, will have a low compatibility index with a merchant for which the database 17 indicates a high average ticket value.

For a customer who is tagged as price sensitive, step 205 may result in the customer being matched with a merchant which operates in a discount sector of the marketplace (e.g. a merchant for whom the average prices of products in a certain product category, such as the category specified in step 201, are low), or a merchant who is currently offering discounted prices in relation to the products indicated in step 201.

Particularly in the case of a customer who is tagged as brand loyal, the compatibility index may be calculated using also data in the database 9. For example, a higher compatibility index will be obtained for a merchant from whom the customer has made a purchase before (e.g. in a different retail location), or a merchant who offers a product the customer has previously bought (e.g. a customer who tends to buy a certain form of mineral water will be more likely to be matched to a grocery outlet which sells that brand).

As noted above, the customer preference model may categorize the customer into tiers based on historical transaction characteristics (i.e. spending patterns taking into account the value of the customer's previous transactions), and also into tiers based on either price sensitivity or brand loyalty. Merchants too may be categorized into tiers, and the calculation of the compatibility index may be dependent on the tiers into which the merchants and customers have been categorized.

Step 205 may include using known algorithms to calculate a "propensity to buy" for each of the merchants offering the product specified in step 201 at the location specified in step 202. Furthermore, step 205 may include predicting the next product the customer is likely to buy and matching the customer with merchants which offer that product. For example, a customer who has just purchased skis and ski-boots, and who has in step 201 specified "clothing", may be more likely in step 205 to be matched with a merchant who sells clothing for skiers (i.e. the compatibility index for that merchant will be higher).

As noted above, step 205 may only recommend merchants in the location specified in step 202. If step 202 was not performed then in step 205 the server 1 may use the customer's present location (e.g. as obtained by a GPS device of the communication device 21) or limit the search of merchants to those which supply products to any location, for example by mail.

In step 206, the details of the one or more matched merchants (if any), and optionally details of one or more offers the matched merchants are making to provide the product specified in step 201, are displayed to the customer. If the method 200 is being performed by the payment network computer 10, these details are supplied to the communication device 21. Alternatively, if the method 200 is being performed by the communication device 21, the communication device 21 may request this information from the payment server 10, which obtains them from the database 17 and supplies them to the communication device 21. In either case, the communication device 21 may display them to the customer, for example on screen 21a. This may include providing location details of outlets of the matched merchants near the location specified in step 202.

The customer may use the supplied information to make contact with the merchant, e.g. by going to the specified outlet. In this way the customer may obtain more information about the merchant and/or product, or instigate a purchase of the product.

Figure 5:
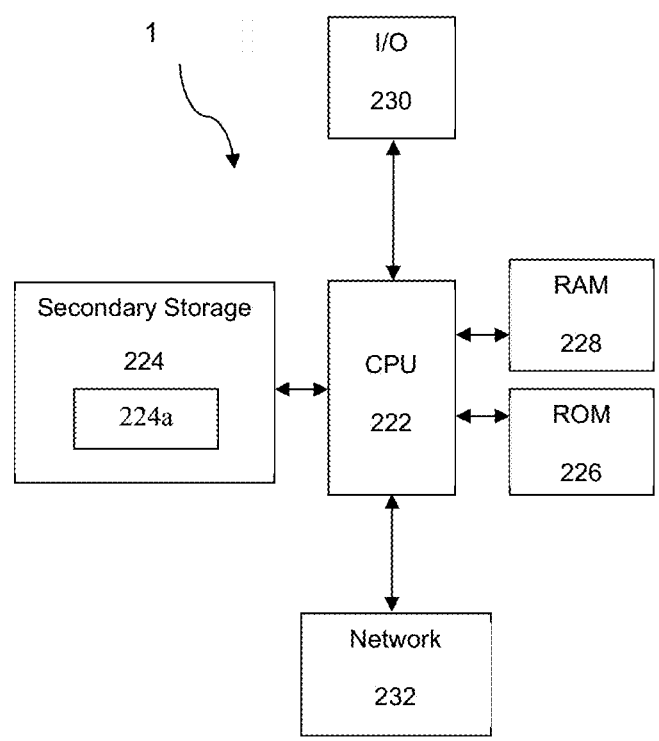
FIG. 5 is a schematic diagram of the structure of the computer system of FIG. 1.

FIG. 5 is a block diagram showing a technical architecture of the computer system 1.

The technical architecture includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture may further comprise input/output (I/O) devices 230, and network connectivity devices 232.

The secondary storage 224 may provide the memory space to support the databases 9, 11, 17. The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has an order processing component 224*a* comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, the tasks of methods 100 and 200 may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 6:
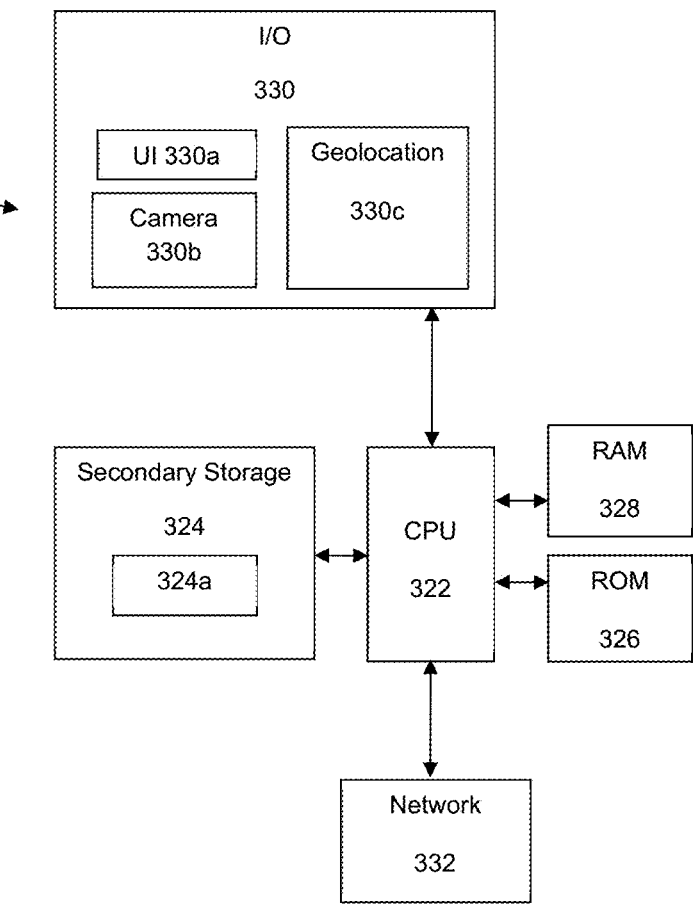
FIG. 6 is a schematic diagram of a communication device associated with a customer.

FIG. 6 is a block diagram showing a technical architecture of the communication device 21. It is envisaged that in embodiments, the communication devices 21 may be a smartphone or tablet, or a personal computer such as a desktop computer or a laptop computer.

The technical architecture includes a processor 322 (which may be referred to as a central processor unit or CPU) that is in communication with memory devices including secondary storage 324 (such as disk drives or memory cards), read only memory (ROM) 326, random access memory (RAM) 328. The processor 322 may be implemented as one or more CPU chips. The technical architecture further comprises input/output (I/O) devices 330, and network connectivity devices 332.

The I/O devices comprise a user interface (UI) 330*a*, a camera 330*b* and a geolocation module 330*c*. The UI 330*a* may comprise a touch screen, keyboard, keypad or other known input device. The camera 330*b* allows a user to capture images and save the captured images in electronic form. The geolocation module 330*c* is operable to determine the geolocation of the communication device using signals from, for example global positioning system (GPS) satellites.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has an order generation component 324*a*, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets.

With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Figure 7:
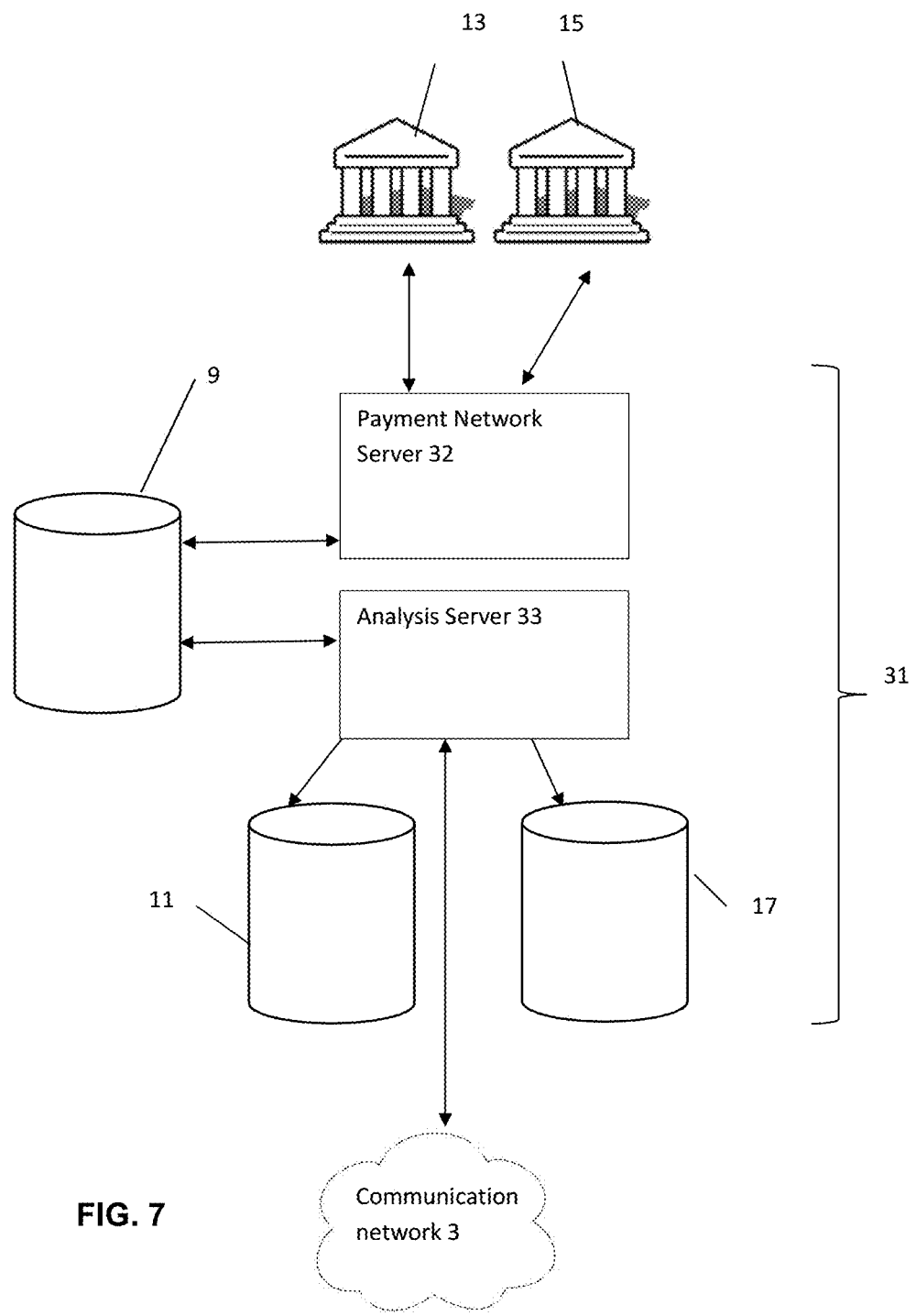
FIG. 7 illustrates an alternative form of a computer system of the computerized network of FIG. 1.

In a variant of the embodiment, the computer system 1 may be replaced by a computer system 31 as illustrated in FIG. 7. The databases 9, 11 and 17 have the same significance as in FIG. 1, but in this case the computer system 31 includes a payment network server 32 which may be of a conventional design. The payment network server 32 processes a payment transaction in the conventional manner described above, by communicating with the acquiring bank server 13 and the issuing bank server 15. The payment network server 32 accumulates the data in the database 9 by the process described above.

The computer system 31 further includes an analysis server 33 (separate from the payment network server 32) which is responsible for performing the methods described above with reference to FIGS. 2 and 4. The analysis server 11 is able to access the data stored in the database 9 to perform the method of FIG. 2, and thereby generate the data in the database 11 by the process described above with reference to FIG. 2. This may include communicating with the POS terminal 5 and/or merchant server 7 using the communication network 3, to interrogate the POS terminal 5 and/or the merchant server 7 for information about transactions as described above.

Figure 4:
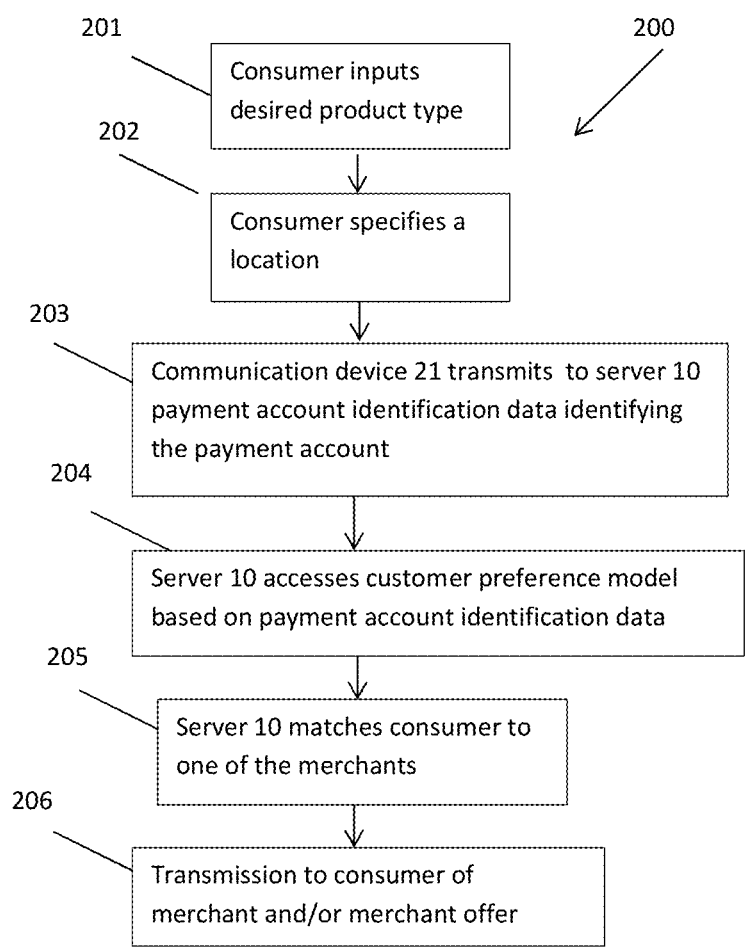
FIG. 4 is a flow diagram of a method according to the invention performed by the computer system of FIG. 1 in the second mode of operation.

The analysis server 33 is also able to communicate with the communication device 21 over the communication network 3, and perform steps 204 and 205 of the method of FIG. 4 as described above, using the data in the databases 11 and 17. The structure of the payment network server 32 and the analysis server 33 may be as illustrated in FIG. 5.

Thus, the computer system 31 is operative to perform all the functions of the computer system 1, but without the methods of FIGS. 2 and 4 putting an additional burden on the payment network server 32.

Whilst the foregoing description has described exemplary embodiments, it will be understood by those skilled in the art that many variations of the embodiment can be made within the scope and spirit of the present invention.

The invention claimed is:

1. A computer system for generating, for a customer associated with a payment card, a customer preference model, the computer system comprising:
   an interface for receiving, for the customer from a point-of-sale terminal, transaction data relating to a plurality of payment transactions the customer makes using the payment card;
   a database for storing the transaction data;
   a database of merchant data, including profiles of a plurality of merchants, the profiles of the plurality of merchants including data indicating products offered by the merchants, and at least one additional characteristic of the merchants;
   a processor; and
   a non-transitory data storage device storing program instructions operative to cause the processor:
      upon receiving transaction data indicating a payment transaction using one of the payment cards, to store the data in the database,
      to generate a model of the price sensitivity of the customer and a model of the brand loyalty of the customer,
      by comparing the price sensitivity model and the brand loyalty model, to derive a first component of the customer preference model which is indicative of whether the payment transactions of the customer are more influenced by price or by brand loyalty, and
      upon receiving data, from a communication device associated with the customer, in respect of the customer specifying a product:
         to identify the merchants offering the product,
         to use the customer preference model and the at least one characteristic for any of the merchants who offer the product, to form a compatibility index between the customer and the merchants who offer the product,
         to receive, from the communication device, data indicative of a geographical location, wherein the compatibility index is calculated in relation to merchants who supply the product in the geographical location, and
         to transmit to the customer, for display on the communication device, information relating to one or more of the merchants and one or more merchant offers for whom the compatibility index is highest,
      wherein,
      if the first component indicates that the payment transactions of the customer are more influenced by price than brand loyalty, the customer is categorized based on the price sensitivity model into one of a pre-determined number of tiers; and
      if the first component indicates that the payment transactions of the customer are more influenced by brand loyalty than price, the customer is categorized based on the brand loyalty model into one of a pre-determined number of tiers.

2. The computer system according to claim 1, in which the program instructions are operative to cause the processor to generate at least one payment size measure which is a measure of the size of payment transactions made using the payment card, and to form a second component of the customer preference model using the at least one payment size measure.

3. The computer system according to claim 2, in which the program instructions are operative to cause the processor to categorize the customer based on the payment size measure into one of a number of tiers.

4. The computer system according to claim 1, which is operative to use the interface to transmit to the point-of-sale terminal or a merchant server a request for additional information relating to the transaction.

5. The computer system according to claim 1, which is arranged to generate a respective customer preference model for each of multiple customers associated with respective payment cards, the interface being operative to receive, for each of the customers, respective transaction data relating to a plurality of payment transactions the customer makes using the respective payment card, and the program instructions being operative to cause the processor to generate the respective customer preference model for each of the customers using the respective transaction data.

6. A computer-implemented method for generating, for a customer associated with a payment card, a customer preference model, the method comprising a computer server:
- (a) receiving, via an electronic interface and from a point-of-sale terminal, respective transaction data relating to a plurality of payment transactions the customer makes using a payment card;
- (b) storing the transaction data in a database;
- (c) generating a model of the price sensitivity of the customer and a model of the brand loyalty of the customer;
- (d) comparing the price sensitivity model and the brand loyalty model to derive a first component of the customer preference model which is indicative of whether the payment transactions of the customer are more influenced by price or by brand loyalty, wherein, if the first component indicates that the payment transactions of the customer are more influenced by price than brand loyalty, the customer is categorized based on the price sensitivity model into one of a pre-determined number of tiers; and if the first component indicates that the payment transactions of the customer are more influenced by brand loyalty than price, the customer is categorized based on the brand loyalty model into one of a pre-determined number of tiers;
- (e) receiving, from a communication device associated with the customer, data from the customer specifying a product;
- (f) obtaining the customer preference model;
- (g) accessing a database of merchant data, including profiles of a plurality of merchants, the profiles of the plurality of merchants including data indicating products offered by the merchants, and at least one additional characteristic of the merchants;
- (h) identifying any of the merchants offering the product;
- (i) using the customer preference model and the at least one additional characteristic of any of the merchants identified as offering the product, to form a compatibility index between the customer and any of the merchants identified as offering the product;
- (j) receiving, from the communication device, data indicative of a geographical location, wherein the compatibility index is calculated in relation to merchants who supply the product in the geographical location; and
- (k) transmitting to the customer, for display on the communication device, information relating to one or more of the merchants and one or more merchant offers for whom the compatibility index is highest.

7. The computer-implemented method according to claim 6, in which at least one of the price sensitivity model and the brand loyalty model is calculated using addendum data in the transaction data comprising stock keeping unit (SKU) data.

8. The computer-implemented method according to claim 6, in which step (c) further includes:
- generating at least one payment size measure which is a measure of the size of payment transactions made using the payment card; and
- forming a second component of the customer preference model using the at least one payment size measure.

9. The computer-implemented method according to claim 6 further comprising using the interface to transmit to the point-of-sale terminal or a merchant server a request for additional information relating to the transaction.

10. The computer-implemented method according to claim 6, which includes generating a respective customer preference model for each of multiple customers associated with respective payment cards, using respective transaction data relating to a plurality of payment transactions each of the customers makes using the respective payment card.

11. The computer-implemented method according to claim 6, in which the information relating to the one or more of the merchants for whom the compatibility index is highest includes information relating to the prices charged by these merchants for the specified product.

* * * * *